United States Patent

[11] 3,604,723

| [72] | Inventor | Harold C. Daily<br>618 Vista Lane, Laguna Beach, Calif. 92651 |
|---|---|---|
| [21] | Appl. No. | 846,823 |
| [22] | Filed | Aug. 1, 1969 |
| [45] | Patented | Sept. 14, 1971 |

[54] STEERING SYSTEM FOR WHEELED VEHICLES
2 Claims, 7 Drawing Figs.

[52] U.S. Cl. .................................................. 280/91,
280/96, 280/423 R
[51] Int. Cl. ...................................................... B62d 7/00
[50] Field of Search ............................................ 280/91,
81.5, 96, 432, 423, 419, 87, 98, 97; 180/14, 22, 23,
6.58, 79.5

[56] References Cited
UNITED STATES PATENTS

| 1,648,917 | 11/1927 | Schvartz ...................... | 280/81.5 |
|---|---|---|---|
| 2,156,601 | 5/1939 | Mosling et al. ............... | 280/91 |
| 2,202,676 | 5/1940 | Towson ........................ | 280/96 |
| 2,468,705 | 4/1949 | Price ............................ | 280/432 |
| 2,638,355 | 5/1953 | Spangler ...................... | 280/81.5 |
| 2,877,858 | 3/1959 | Knight ......................... | 280/423 UX |
| 3,099,460 | 7/1963 | Sheehan ....................... | 280/423 UX |
| 3,140,101 | 7/1964 | Sheppard ..................... | 280/91 |

*Primary Examiner*—Kenneth H. Betts
*Attorney*—Nienow & Frater

ABSTRACT: A steering system and a vehicle employing a steering system incorporating means for introducing feedback in the connection between the steering element and the steering wheel to the end that the direction of the steered wheel is determined not only by the steering element but by the response of the vehicle to a change in steered wheel direction. This feature is combined in an articulated vehicle with a pivotal connection between the two portions of the vehicle at a point ahead of the steered wheel. The steered wheel is carried by one portion of the articulated vehicle and in which the driver's station is carried by the other section of the vehicle.

INVENTOR
HAROLD C. DAILY
BY

Nunno & Frater

ATTORNEYS

INVENTOR
HAROLD C. DAILY
BY
Niemmo & Frater
ATTORNEYS

STEERING SYSTEM FOR WHEELED VEHICLES

This invention relates to improvements in steering systems for wheeled vehicles.

It is an object of the invention to provide a wheeled vehicle of the tractor and trailer type whose steering system provides a high degree of stability when the vehicle is made to execute turning movement and when the vehicle is being propelled by its load. A related object is to provide a steering system which will tend to prevent trailers and their tractor from jackknifing. Another object of the invention is to provide a steering system which simplifies the execution of certain steering maneuvers and in this connection the invention is applicable both to vehicles which are not articulated, in the sense that a tractor and its trailer are articulated, and to vehicles that are articulated. Thus the invention is applicable to vehicles in which all of the wheels are carried on a single frame as well as to vehicles whose wheels are carried on frames that are pivotally connected to one another.

Nonetheless, while it is applicable to both, the invention is particularly advantageous when employed in the tractor and trailer combination and an embodiment of the invention suited for this application has been selected for illustration in the drawings. Maneuverability of the combination can be increased if the rearmost wheels rather than the forward wheels of the tractor are made the steered wheels of the unit thus to reduce the turning circle of the combination. However, rear wheel steering is inherently less stable because frictional force between the road and the turned wheel tend to force the wheel to turn in increased degree. The invention overcomes this difficulty and to overcome it is one of the objects of the invention. Vehicles incorporating the invention tend to have their steered wheels return to alignment in the direction of movement of the vehicle even when it is the rear wheels that are steered and the provision of such a system is another of the objects of the invention.

A further object is to provide a steering system for a vehicle which will cause the vehicle to maneuver in response to a steering movement in the same fashion whether the vehicle is going forward or in reverse direction.

Certain of these, and other objects and advantages of the invention which will hereinafter appear, are realized in part by the provision of a steering member; and a steered wheel capable of being repositioned from a reference position through a range of directions including a second direction and by the provision of interconnecting means connecting the steering member and the steered wheel for redirecting the steered wheel from the reference direction to the second direction in response to steering member input signals and, as an incident to vehicle movement, for redirecting said steered wheel from the second position to said reference position in a degree inversely variable with the degree in which the vehicle direction differs from the direction of the steered wheel.

Stated in other terms, the invention employs a feedback system in which the steered wheel direction is determined jointly by the input instruction relating to direction and by the degree in which the vehicle direction differs from the instruction. The feedback is negative so the system is inherently more stable than is manual steering alone. This is especially true in the case of vehicles in which the rear wheel or wheels is steered. Thus, with respect to vehicles all of whose wheels are carried by a fixed frame, the invention permits maneuvering with less steering wheel return movement because the feedback tends to overcome turning. For this reason corrective steering action tends to be in the direction of the desired turn rather than an anticipatory action opposite the desired remaining turning movement. Nonetheless the system does permit anticipatory, reverse steering. Thus it simplifies steering and no skill is required which differs from that required for conventional steering. These features of the invention make it attractive for use in heavy, off-the-road vehicles where operator confusion or emergency reaction might result in an accident if steering was materially different. The fact that the invention improves practicality of rear wheel steering is important for tractor-trailer combination for at least two reasons. If the rear wheels of the tractor are steered, the separation of steered wheels and trailer wheels is less whereby the trailer wheels follow the steered wheels more closely than in conventional tractor-trailer combinations. Also the pivot point of interconnection between the tractor and trailer may be located ahead of the steered wheels to oppose jackknifing. This later advantage results from the fact that motion of the tractor tends to straighten the steered wheels. If the load pushes the tractor ahead the tractor wheels will straighten.

If the steering wheel (or other steering element) is mounted on the trailer or equivalently arranged so that the driver's position corresponds to trailer direction rather than tractor direction, then the driver has direct information and not merely intuitive knowledge or the reversed image in his mirror on which to form his steering judgments. His task is made easier in either direction of motion and in heavy traffic the task is not only much easier but safety is enhanced.

Figure 1:
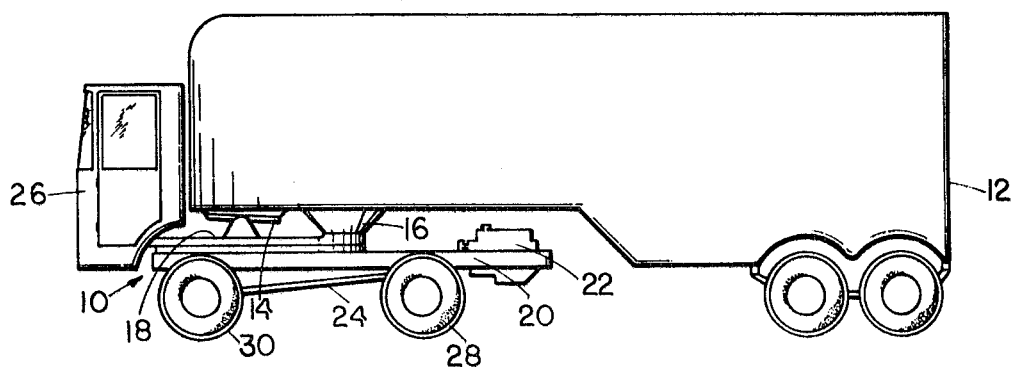
FIG. 1 is a view in side elevation of a vehicle embodying the invention.

Referring to FIG. 1 of the drawing, the vehicle there shown comprises a tractor generally designated 10 and a trailer 12. The trailer is not unlike trailers currently employed in trailer-tractor combinations. The step up in floor level occurs somewhat more rearwardly than in trailers employed with conventional tractors because a substantial portion of the tractor extends rearwardly of its "fifth wheel" in this embodiment. That is not necessary in a tractor design in which the tractor has a shorter wheel base and has its engine mounted more forwardly. The fifth wheel is identified by the reference numeral 14. Because the tractor extends rearwardly of the fifth wheel in substantial degree, means are provided for insuring that the tractor cannot tilt sufficiently relative to the trailer to result in interference between the tractor and the underside of the trailer. In this embodiment that means comprises a stop structure 16. This structure insures that any relative pivotting in the vertical plane between tractor and trailer is accounted for in the wheel support structures of the vehicles rather than in pivotal movement around the fifth wheel interconnection.

The tractor 10 has its frame divided into two parts identified as an upper frame 18 and a lower frame 20. The wheels of the tractor and its engine 22 are carried on the lower frame 20. The driver's cab and his steering wheel (or other steering element) are mounted on the upper frame 18. The upper and lower frames have pivotal connection one to the other on an axis which in this embodiment is concentric with the axis of the fifth wheel 14. Means are provided for locking the upper and lower frames together against relative movement. Ordinarily, in the absence of a trailer, the upper and lower frames are locked together so that the tractor is transformed into single frames vehicle differing from conventional vehicles only that it has rear-wheel steering and front-wheel drive, the engine 22 being connected the front wheels through the tongue tube 24.

When the trailer is attached at the fifth wheel 14 to the tractor then the fixed connection between the upper frame and lower frame of the tractor is removed and the upper frame of the tractor is fixed instead to the trailer 12. Unlike the conventional connection at a fifth wheel these elements are fixed so that relative rotational movement of the upper frame and trailer around the pivot axis of the fifth wheel is precluded. Instead the upper frame 18 and the trailer 12 rotate about that fifth wheel axis as a unit relative to the lower frame 20. The driver's cab 26 is fixed to the trailer 12 so that the cab points in the direction in which the trailer is oriented. This means that the driver has information about the position of the rear wheels of his trailer that he cannot have when driving a conventional tractor-and-trailer combination. In the vehicle of FIG. 1 the driver knows that the rear wheels of the trailer are directly behind him.

In FIG. 1 it is the rear wheels 28 that are turned to accomplish the steering maneuver. The front wheels 30 are not steered. Analysis of the turning circles of the vehicle of FIG. 1 will illustrate that the combination of the tractor and the trailer and the tractor alone are more maneuverable, because the rear wheels 28 of the tractor are made steerable, than would be the case if it was the front wheels 30 which were the steered wheels.

While not visible in FIG. 1, the vehicle there shown has a steering wheel located in the driver's cab 26. That steering wheel is operatively connected to the steered wheels 28. That steering connection includes an arrangement which makes the position or direction of the wheels 28 vary in accordance with changes in the position of the steering wheel up in the driver's cab. In addition, that interconnection between the steering wheel and the steered wheels includes a means for changing the position or steering direction of the steered wheels by an amount which depends upon the degree in which the lower frame has turned. Assuming that the reference position of the wheel 28 is a straight ahead position in which the wheel lies in a plane parallel to the plane of the unsteered wheels and indeed of the vertical midplane of the lower frame, the steering wheel is capable of turning the steered wheel to either side of that reference position or reference direction. The amount in which the steered wheel is turned from its reference direction depends upon the degree in which it is desired to turn the vehicle. In the case of front wheel steering, the wheels are turned in the direction which it is desired to turn. In the case of rear wheel steering, such for example as in the embodiment selected for illustration in FIG. 1, the wheels are directed in an opposite direction from that in which it is desired that the vehicle will turn. Whether the steered wheels be the forward wheels or the rear wheels, feedback means are incorporated in that connection from the steering wheel to the steered wheels to diminish the degree in which the steered wheels are positioned away from their reference position in a degree which is determined by the amount in which the direction of the vehicle has already been changed. In an articulated vehicle such as a tractor and trailer combination it is possible to vary the amount of feedback in the steered wheel positioning system so that it varies with the degree of angular difference between the direction of the trailer and the direction of the steered wheels.

Figure 6:
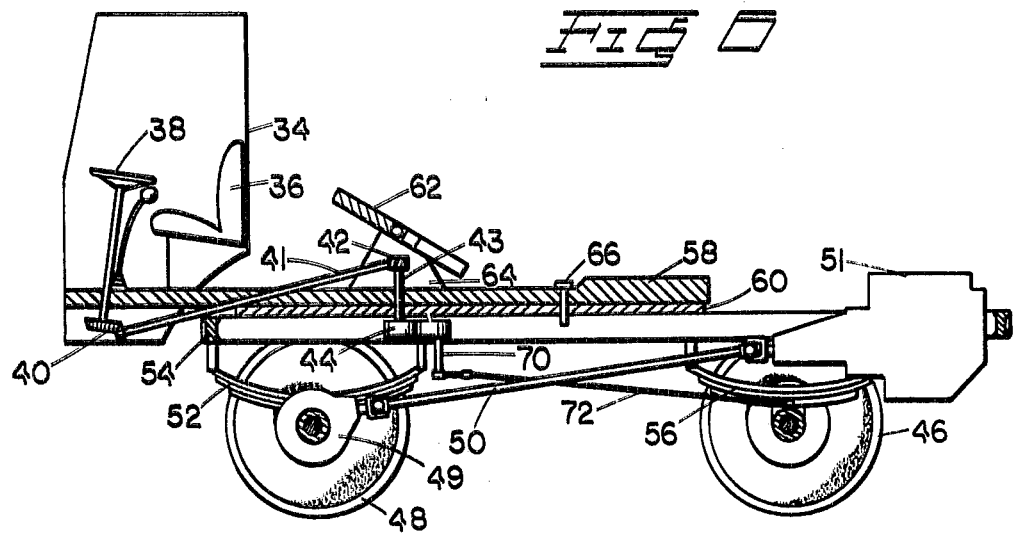
FIG. 6 is a view in vertical section of the tractor portion of the vehicle of FIG. 1.

It should be recognized that the invention is applicable in two structural arrangements which differ slightly from one another. Thus the invention is applicable to nonarticulated vehicles in which case the amount of feedback is a function of the difference between wheel direction and the direction of the frame on which the wheel is carried. In the other situation where there is an articulated vehicle the amount of feedback can be and advantageously is made a function of the difference between the direction of the steered wheel and the direction of the primary portion of the vehicle which in this case is the trailer and the driver's cab. A variety of apparatus is available for performing the function and only ordinary skill is required to select a structure which is commensurate with and appropriate to the remainder of the vehicle design. The invention is thought to provide its greatest advantage in the case of the articulated vehicle and this is the preferred embodiment. Further, it appears that application of the invention to a nonarticulated vehicle is understood if its application to an articulated vehicle is understood. A schematic diagram of an articulated vehicle is shown in FIG. 6. In that Figure the reference numeral 34 identifies the driver's cab which contains a seat 36 and a steering wheel 38 which is geared at gears 40 to a shaft 41. That shaft is geared by gears 42 to a shaft 43 which comprises an input shaft of the structure 44 wherein steering element inputs and feedback information is combined to produce output to the steered wheel. The rear wheel 46 is the steered wheel. In this embodiment the forward wheel 48 is not steered but it is a drive wheel being connected by an axle and a drive gear mechanism 49 and a tongue tube 50 to the engine 51 of the vehicle. Wheel 48 is carried through a spring structure 52 on the lower frame 54 of the vehicle. In somewhat similar fashion the steered wheel 46 is carried by the spring 56 on the lower frame 54 of the vehicle. The upper frame of the vehicle is identified by the reference numeral 58. It is separated from the lower frame 54 by a large thrust bearing 60 which is carried by the lower frame 54. The fifth wheel, upon which a trailer may be carried, is designated by the reference numeral 62. The trailer is carried upon a support structure 64 which is fixed to the upper frame. There is a pivotal connection between the fifth wheel 62 and the support 64 which permits the fifth wheel 62 to be tilted relative to the upper frame. The pivotal axis for that motion is generally horizontal in that it lies parallel with the plane of the frame. It extends in the direction of the frame or perpendicularly to the forward direction of the upper frame. The pin 66 represents means for locking the upper and lower frames against relative rotation. In this embodiment the element 44, which combines steering inputs and feedback inputs, is arranged such that the amount of the feedback introduced into the steering system is a measure of the angular difference between the direction of the upper frame and the direction of the steered wheel 46. When the trailer is added, its direction and the direction of the upper frame are determined by the position of the trailer wheels. In the absence of the trailer the structure of FIG. 6 includes no means for introducing feedback information into the unit 44. Accordingly, the pin 66 is inserted to preclude relative movement between the upper and lower frames and the vehicle is driven like an ordinary vehicle with rear wheel steering. When the trailer is connected, it is fixed to the upper frame so that pivotal movement between the trailer and the upper frame is precluded. Thus, although the fifth wheel 62 is shown to have conventional form the connection between it and the trailer is ordinarily made so that the trailer cannot pivot around the fifth wheel. However, if for any reason it becomes desirable to complete a conventional, pivotal connection between the tractor and the trailer this can be done using the fifth wheel 62 in conventional fashion. Accordingly, it is advantageous that the pivot axis between the trailer and the tractor be coincident with the axis of pivotal movement between the upper and lower frames and coincident with the axis of rotation of the steering input member 43 as shown. It is not essential that these three axes be coincident but it will be apparent that the construction can be simplified if these axes are made coincident.

The output shaft of the structure 44 is identified by the reference numeral 70. It is connected by a drag arm 72 to the steering linkage of the rear wheel 46. That linkage is not shown in FIG. 6 but it may have any conventional form such, for example, as the form that it is shown to have in FIGS. 2, 3, 4 and 7. The function of the unit 44 in FIG. 6 is to transmit to the steered wheel steering mechanism information about the position or direction that the steered wheels are to take and to supply the force to cause the steered wheel to be steered to that position. This information and the force appear at output shaft 70. The driver supplies input information, and force, relating to the direction in which he wants the vehicle to proceed by turning the steering wheel 38. This results in rotation of the input shaft 43. There is one more input structure to unit 44 which is not apparent upon examination of FIG. 6 but which introduces the feedback signal. As previously described that feedback signal could be a signal which is varied as a function of the difference between the position of the two frames or which could be varied as the difference between the direction of the upper frame and the direction of the wheels 46. Actually, these two differences are related functions such that the feedback signal magnitude may be expressed in either fashion. The structure 44 rotates the shaft 70 in accordance with the difference between the two input signals. In this sense it is a subtracting device but since the subtraction is algebraic it will both add and subtract and is conventionally called an "adder" when employed in a feedback system. When not employed in a feedback system it is often called a differential mechanism and the unit 44 might comprise a differential gear set in which one of the input gears is fixed to one of the frames whereby to introduce the other input information signal. It will be recognized that rearrangement of the differential gearing can introduce the feedback signal directly as the difference between the direction of the upper frame and the wheel direction or, alternatively, directly responsive to the difference between the directions of the upper and lower frames. For the sake of simplicity the differential gear set has been represented schematically in FIG. 5 in a way that permits all of the gears involved to be seen in their entirety in a single view.

The gears are housed in a frame 74 which is fixed to the lower frame of the vehicle. Gear 76 is the steering input gear. It is fixed to shaft 78 which rotates about an axis which is concentric with the axis of relative rotation between the upper and lower frames. The rotational position of the shaft 78 and of the steering gear 76 relative to the upper frame is determined only by the rotational position in which the driver of the vehicle places his steering wheel. Gear 80 is called the output gear and it is fixed to output shaft 82 which is journaled in the housing 74. There is need, because of the way the feedback system is arranged in this embodiment, to reverse the direction of steered wheel displacement when the vehicle is backed down. For this purpose the steering system must include a means for reversing the steered wheel response to a steering wheel input when the vehicle is being moved in reverse. To this end the differential gear set is provided with two means for interconnecting the input gear 76 to the output gear 80. When the vehicle is driven forward the input and output gears are interconnected by a pair of gears 84 and 86. In this circumstance the single reversing gear 88 is moved out of engagement with the gears 76 and 80. Use of the two gears 84 and 86 insures that the gear 76 and 80 will turn in opposite directions. When the vehicle is driven in reverse the gears 84 and 86 are moved out of engagement with the gears 76 and 80. and the reversing gear 88 is moved into engagement with both gears. In this circumstance the gears 76 and 80 rotate in the same direction when either of them is rotated. For the sake of clarity the differential structure incorporates two arms. One of them is designated by the reference numeral 90. It is assumed that this arm is fixed to the shaft 78 and that it is rotatable about the axis of that shaft whereby rotational movement of arm 90 in the plane of FIG. 5 results in rotational movement of the gear 76 in the same direction that the arm 90 is rotated. Similarly the other arm 92 is fixed to the shaft 82 and is rotatable in the plane of FIG. 5 about the axis of shaft 82 so that clockwise rotation of the output gear 80 results in clockwise rotation of the shaft 92 and conversely so that counterclockwise rotation of gear 80 results in counterclockwise rotation of the shaft 92. Assuming that the gears 84 and 86 are engaged with gears 76 and 80 and that the reverse gear is disengaged then a rotational movement of the input arm 90 in either direction will result in rotation of the arm 92 in equal degree in an opposite direction. Thus, the output element 92 will be repositioned in a direction and in a degree determined by the repositioning of the input arm 90. If the input arm 90 is held fixed by holding the steering wheel in a given position and if there is relative rotation between the upper and lower frame of the vehicle then the axis of the output shaft 82 will be rotated about the axis of the input shaft 78. In that circumstance if the gears 84 and 86 are engaged and the reverse gear 88 is disengaged then rotation of the axis of shaft 82 about the axis of shaft 78 results in gear 84 being walked along the stationary teeth of gear 76. This results in rotation of gear 84 which is translated into rotation of gear 86 and ultimately into rotation of gear 80. Shaft 82 and output arm 92 rotate with the gear 80. Consequently, clockwise rotation in FIG. 5 of the axis of shaft 82 around the axis of shaft 78 results in counterclockwise rotation of arm 92. Conversely if the axis of shaft 82 is rotated counterclockwise around the axis of shaft 78 then the arm 92 will be rotated in a clockwise direction.

Figure 2:
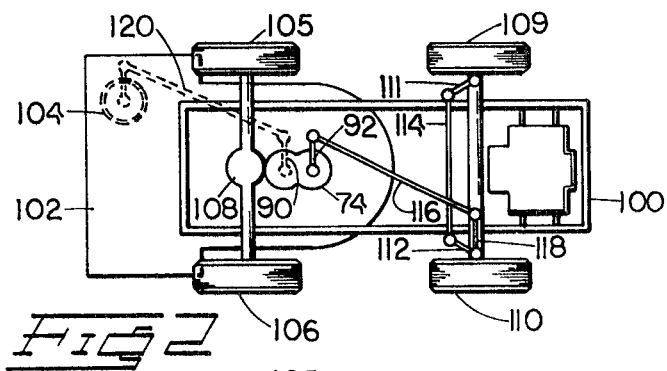
FIGS. 2, 3 and 4 are schematic drawings of a vehicle embodying the steering system of the invention illustrating the relationship between the steering mechanism, the vehicle wheels and the vehicle direction.
Figure 5:
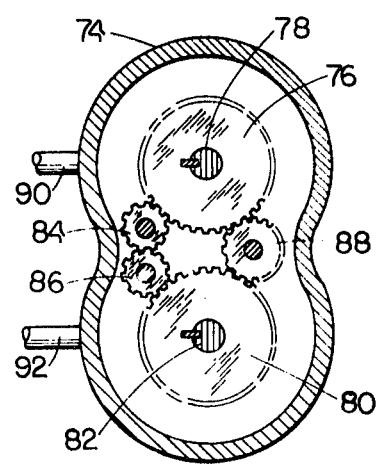
FIG. 5 is a diagram of an apparatus capable of adding and subtracting angular displacements.
Figure 3:
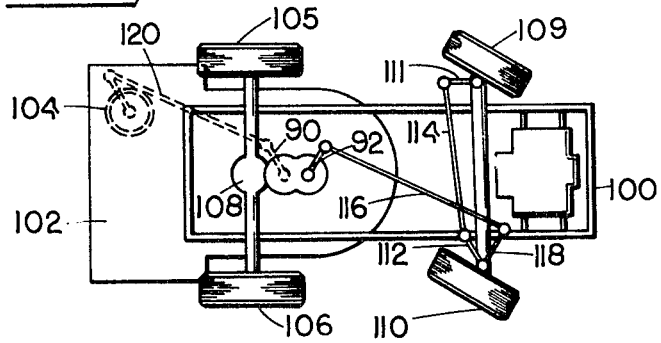
Figure 4:
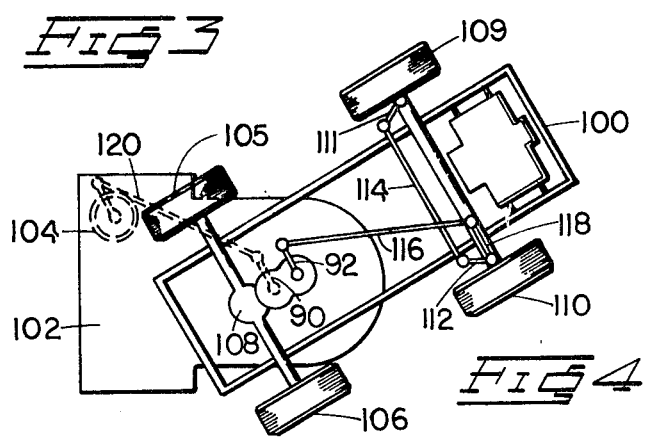

Operation of the differential unit of FIG. 5, and indeed operation of the steering system itself, is depicted schematically in FIGS. 2, 3 and 4. In these Figures a bottom view of the tractor is represented. In each case the tractor has a lower frame 100 and an upper frame 102. The steering wheel 104 is carried by the upper frame. The vehicles have front wheels 105 and 106 which are the drive wheels of the unit and are powered by the motor through a differential gear drive 108 which permits these wheels to turn a corner by rotating at different angular velocities. It is the rear wheels 109 and 110 which are the steered wheels of the vehicle. Steering arms 111 and 112 associated with wheels 109 and 110 respectively are interconnected by a tie rod 114. The steering movements are imparted to this steering mechanism by pushing and pulling on a drag rod 116 which has pivotal connection at the end of a lever arm 118 which is fixed to one of the steering arms.

The steering mechanism of the vehicle shown in these three FIGS. 2, 3 and 4 includes the structure depicted in FIG. 5 although only the housing 74, and the input arm 90 and the output arm 92 are visible. The rod 120 connects the steering wheel 104 with the input arm 90. In FIG. 2 the front wheels and the rear wheels of the unit are all aligned in parallel planes or common planes and the vehicle will move straight ahead or straight rearwardly in response to driving power applied to the drive wheels 105 and 106. The steered wheels occupy their reference position in FIG. 2. From the description of the mechanism in FIG. 5 it will be clear that if the steering wheel 104 is rotated so that the rod 120 pulls forwardly, the input arm 90 will be rotated in a counterclockwise direction about its pivot axis. As a result the input gear will rotate and if the differential mechanism is arranged for forward motion of the vehicle then the output gear and its output arm 92 will be rotated in a clockwise direction resulting in redirection of the steered wheels 109 and 110 in a direction which tends to carry the lower frame counterclockwise about its pivot with the upper frame. That pivot is concentric with the axis of rotation of the input arm 90. This situation is illustrated in FIG. 3 wherein it is assumed that the steering motion of the steered wheels was accomplished without any forward motion of the tractor. Comparison of FIGS. 2 and 3 shows that the two arms 90 and 92 are spread apart, each of them moving through a similar angle, when the steering wheel is steered in one direction. Conversely, if the steering wheel were turned in the opposite direction the steered wheels 109 and 110 would have turned in the opposite direction and the two arms 90 and 92 would have turned in the opposite direction. If next the vehicle is made to move in a forwardly direction while the steering wheel 104 is held firmly against rotation, the steered wheels 109 and 110 will carry the lower frame 100 in a direction which is counterclockwise relative to its pivotal connection with the upper frame. This carries the pivotal axis of arm 92 counterclockwise around the pivotal axis of the input arm 90. The effect of that relative rotational movement can be seen in FIG. 5 and has been previously explained. The result is that the output gear will be rotated to bring the two arms 90 and 92 back toward one another so that they are again in parallel as they were in FIG. 2 but as the angle between the two arms becomes less, arm 92 pulls upon the drag rod 116 to straighten the rear wheels and bring them back to reference position as they are shown to be in FIG. 4. Thus, the mere fact that the lower frame was rotated relative to the upper frame as an incident to forward motion of the vehicle, while its rear wheels were turned away from their reference position, resulted in a feedback input to the steering system which brought the steered wheels back to reference position. The three FIGS. 2, 3 and 4 illustrate the situation that obtains without the trailer being attached to the upper frame but it will be clear, when the trailer is attached to the upper frame by a fixed connection so that the upper frame points in the same direction in which the trailer is pointing, that the upper frame will not remain in its original position as implied in FIG. 4. Instead, the upper frame will have a position dictated by the position of the trailer wheels. These wheels will follow the direction dictated by the direction of the tractor wheels except that it will turn on a larger turning circle because the trailer wheels are located at greater distance from the pivot point. When the trailer is attached to the tractor so that the upper frame is turned then the input gear is rotated with reference to the earth as the trailer is pulled into line with the lower frame of the tractor. In this circumstance the reference for engaging rotational displacement of the input gear is no longer the earth itself but is the direction of the trailer. But this means only that the magnitude of error changes at a different rate as the vehicle proceeds. Neither the principle of the invention or its operation is changed.

Figure 7:
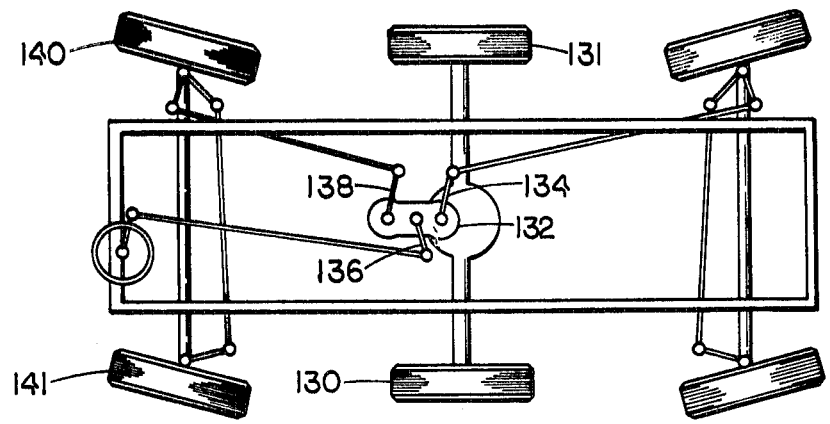
FIG. 7 is a schematic drawing illustrating how the steering system of the invention is applied to an alternative form of vehicle.

FIG. 7 of the drawing illustrates an embodiment which is especially maneuverable. In addition, this embodiment has the advantage that there is effective cancellation of external forces which tend to change vehicle direction and which are transmitted to the driver's steering wheel as a force requiring compensation. Thus, wind blowing against the side of the vehicle results in no transmission of force back to the driver that must be compensated for by the application of an opposing force. Similarly, a roadbed that tilts to one side, and which results in a tendency for conventional vehicles to move off to the edge of the roadway thereby requiring a constant effort on the part of the driver to hold the vehicle in position, presents no problem with the steering arrangement depicted in FIG. 7. This arrangement is incorporated in a tractor intended to pull a trailer, the trailer is advantageously made to have a pivotal connection with the tractor at a point approximately between the drive wheels 130 and 131. In this case the differential structure 132 includes an output arm 134 which corresponds to the output arm 92 of FIGS. 2, 3 and 4 and it includes an input arm 136 which corresponds to the input arm 90 of those figures. In addition the structure 132 includes a second output gear which is made to rotate in a direction opposite the output gear connected to arm 134. That second output gear has an arm 138 which is connected to the steering lever associated with the front wheels 140 and 141. Otherwise the differential gear set 132 is similar to the set shown in FIG. 5.

In connection with the differential gear sets 44 of FIGS. 2, 3 and 4 and with the gear set of FIG. 5 and the set 132 of FIG. 7, the representation in these figures is schematic. While use of the several arms 90, 92, 134, 136 and 138 is possible it should be recognized that this kind of arm arrangement makes it possible to move the interconnection gearing to a dead center position in which their function would be impeded. The arms have been shown because the relationship that they have to one another in the several figures of the drawings is indicative of the relationship of the gears to which they are connected. Thus, gear operation is more easily apparent. The over center problem can be eliminated simply by employing gears rather than lever arms to transmit motion. Furthermore, although I have shown and described certain specific embodiments of my invention, I am fully aware that many modifications thereof are possible. My invention, therefore, is not to be restricted except insofar as is necessitated by the prior art and by the spirit of the appended claims.

I claim:
1. In a wheeled vehicle capable of being steered to follow the direction of a steered wheel:
   a steering member;
   a steered wheel capable of being repositioned through a range of directions including a second direction from a reference position;
   interconnecting means connecting the steering member and the steered wheel for redirecting the steered wheel from the reference direction to the second direction in response to steering member input signals and, as an incident to vehicle movement, for redirecting said steered wheel from the second position to said reference position in a degree variable with the degree in which vehicle direction differs from the direction of the steered wheel, said interconnecting means comprising a subtractor having its output connected to redirect said steered wheel and having one input responsive to the direction of the steering member and having another input responsive to the degree of direction change of the vehicle;
   means for converting said subtractor to an adder to facilitate steering said vehicle in reverse;
   said vehicle comprising a tractor and a trailer, the tractor mounting said steered wheel and mounting a second wheel forward of the steered wheel, and the trailer having pivotal connection to said tractor forwardly of said steered wheel and having a wheel rearwardly of said steered wheel, said second wheel being a steered wheel; and
   means for steering the second wheel in a direction complementary to that in which said steered wheel is steered.
2. In a wheeled vehicle capable of being steered to follow the direction of a steered wheel:
   a steering member;
   a steered wheel capable of being repositioned through a range of directions including a second direction from a reference position;
   interconnecting means connecting the steering member and the steered wheel for redirecting the steered wheel from the reference direction to the second direction in response to steering member input signals and, as an incident to vehicle movement, for redirecting said steered wheel from the second position to said reference position in a degree variable with the degree in which vehicle direction differs from the direction of the steered wheel;
   an upper frame and a lower frame pivotally connected to the upper frame;
   the lower frame being carried by the steered wheel and the steering element being carried by the upper frame;
   said interconnecting means comprising a differential structure having two displacable input elements and an output element displacable as a function of the difference between displacement of its input elements;
   said steering element being connected to one of said input elements, the lower frame being connected to the other input element and the steered wheel being connected to the output element;
   said differential mechanism comprising two gears, one of the two being rotatable about the axis of the pivotal connection between the frames in response to displacement of said steering element, the other being offset from said pivotal axis and having connection to said lower frame.